UNITED STATES PATENT OFFICE.

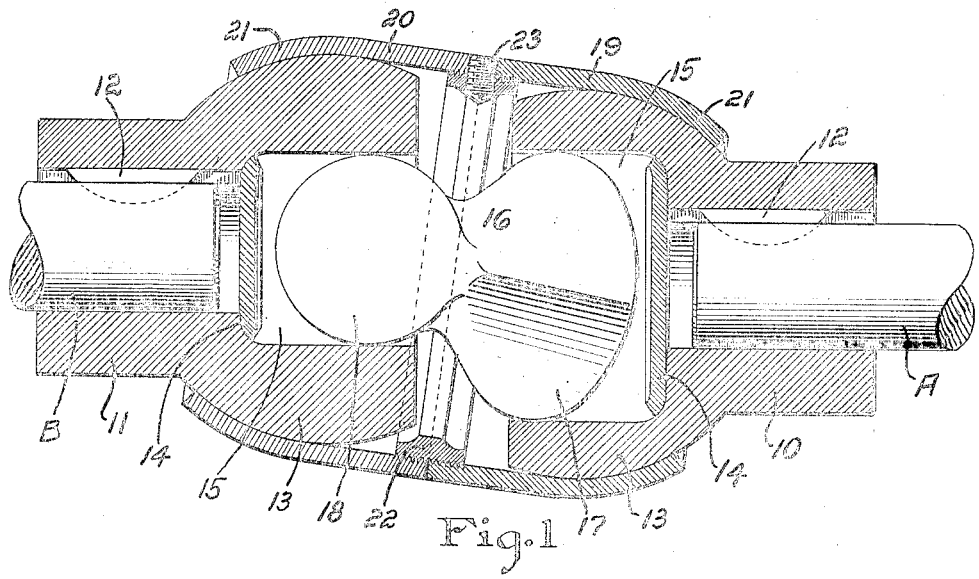
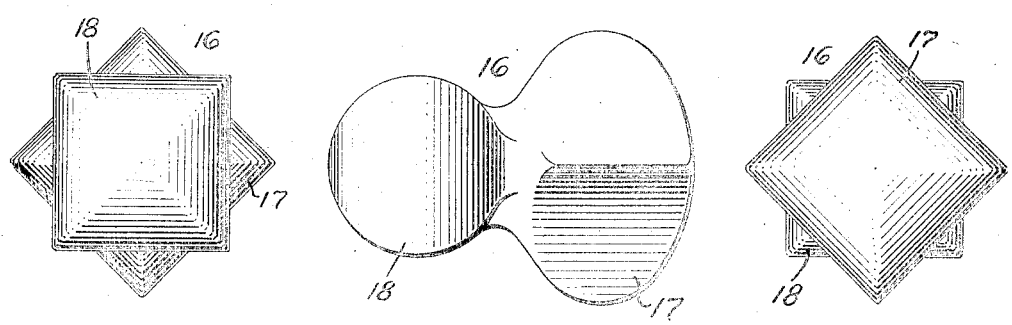
Fig. 1   Fig. 2   Fig. 3   Fig. 4

LAWRENCE F. WHITNEY, OF NORWALK, AND GEORGE A. KAY, OF SOUTH NORWALK, CONNECTICUT, ASSIGNORS TO THE WHITNEY ENGINEERING COMPANY, OF NORWALK, CONNECTICUT, A CORPORATION OF CONNECTICUT.

FLOATING LINK COUPLING.

1,408,789.     Specification of Letters Patent.     Patented Mar. 7, 1922.

Application filed April 13, 1921. Serial No. 461,171.

*To all whom it may concern:*

Be it known that we, LAWRENCE F. WHITNEY and GEORGE A. KAY, citizens of the United States, residing at Norwalk and South Norwalk, county of Fairfield, State of Connecticut, have invented an Improvement in Floating Link Couplings, of which the following is a specification.

This invention relates to shaft couplings and has for its object to provide an improved floating coupling adapted to connect, for rotation in unison, two shafts which are slightly out of alinement either angularly or laterally and also to allow endwise motion of said shafts, which coupling is of simple and substantial construction, which is composed of relatively few parts, which will be of long life, which has no projections which are likely to catch exterior objects, and which may be easily and quickly assembled and disassembled to connect and disconnect the shafts.

With the foregoing and other objects in view, we have devised the novel coupling which we will now describe, reference being had to the accompanying drawings wherein:

Fig. 1 is a longitudinal sectional view of the complete coupling.

Fig. 2 is an end elevation of the floating coupling link as viewed from the left in Fig. 3.

Fig. 3 is a side elevation of the coupling link.

Fig. 4 is an end elevation of the coupling link as viewed from the right in Fig. 3.

A and B denote two shafts to be coupled said shafts being shown for illustrative purposes as disposed with their axes parallel but offset from one another. 10 and 11 denote complementary coupling members on the ends of the shafts A and B, respectively, said members being secured to said shafts for rotation therewith in any suitable manner, as by means of keys 12. Each of the coupling members 10 and 11 is provided at its forward end adjacent the complementary coupling member with an enlarged head 13 of substantially spherical form. At its forward end each of the heads 13 is provided with a socket 15 of non-circular transverse section, the bottoms of said sockets being preferably closed by inserted plates 14.

16 denotes a floating coupling link adapted to bridge the space between the adjacent ends of the coupling members 10 and 11, said link being formed at its ends with heads 17 and 18 which are received in the sockets 15 of the coupling members 10 and 11 respectively. In transverse section (and also in end elevation) the heads 17 and 18 correspond substantially to the sockets 15 in which they are received, so as to be in power transmitting engagement therewith. As herein shown the sockets 15 and heads 17 and 18 are substantially square in transverse section, the head 17, while disposed coaxially with respect to the head 18, being angularly offset approximately 45° therefrom. The heads 17 and 18 are longitudinally rounded, or of a substantially spherical configuration with flattened sides to provide the desired angular cross section, thereby permitting angular displacement of the coupling link with respect to the coupling members 10 and 11, and consequently permitting either lateral or angular displacement of the shafts, without disturbing the power transmitting connection between them.

As will now be seen, the construction above described affords a connection between the shafts A and B whereby rotation of one will be transmitted to the other, which connection is in no way dependent upon the alinement of the shafts, whose axes may be either parallel and laterally offset, as shown, or may be disposed at an angle to one another in the same or different planes. The sockets 15 are preferably of a depth considerably in excess of that required to afford the necessary driving engagement between the coupling members and link, thereby permitting relative endwise movement of the shafts without disturbing the driving connection, the heads of the link moving longitudinally in said sockets during such relative movement of the shafts.

In order to hold the parts in assembled relation, as well as to enclose and protect the same and to serve as a lubricant retainer, there is provided a divided housing comprising two hollow, substantially cylindrical members or thimbles 19 and 20 having contracted rear ends 21 shaped substantially to fit the rear surfaces of the spherical heads 13 of the coupling members. The housing members or thimbles 19 and 20 are secured together at their forward or adjacent ends in any suitable manner, preferably by means of an internal coupling ring 22 in threaded engagement with the ends of said housing members and locked in position by a hollow set screw 23. By virtue of the spherical configuration of the ends of the housing members and the heads of the coupling members, it will be seen that said housing members and heads constitute ball and socket joints which permit relative movement of said members and consequently permit the relative axial positions of the coupling members and shafts to be varied without disturbing the operative engagement of the parts. The diameter of the cylindrical portions of the housing members 19 and 20 is substantially equal to that of the heads 13 of the coupling members 10 and 11, so as to permit said housing members to remain in close engagement with said heads notwithstanding inward movement of the latter incidental to relative endwise movement of the shafts. Such inward movement of the heads 13 is, however, limited by engagement thereof with the coupling ring 22, when the latter is employed, and the parts are preferably so proportioned that said heads will engage and be stopped by said ring before the ends of the coupling link 16 are brought into engagement with the bottoms of the sockets 15, thereby preventing accidental injury to said link.

In assembling the coupling, the housing members or thimbles 19 and 20, with the coupling ring 22 in threaded engagement with one of them, are slipped over the coupling members 10 and 11 from the rear or outer ends prior to the attachment of said coupling members to the shafts. One of the heads of the link 16 is then inserted into one of the sockets 15, and the shafts then brought into the desired position, the other head of the link 16 being caused to enter the socket 15 of the complementary coupling member. Finally, the coupling ring 22 is engaged with the other housing member, and the set screw 23 inserted, thereby completing the coupling.

It will be observed that, with the housing in place, the coupling as a whole presents a relatively smooth exterior surface having no projections which are likely to catch exterior objects, thereby reducing to a minimum danger of accident from this source.

Having thus described our invention, we claim:

1. A shaft coupling comprising a pair of complementary coupling members provided in their adjacent faces with substantially square sockets, and a floating link connecting said members and having substantially square heads received in said sockets, said heads being angularly offset at an angle of approximately 45° to each other.

2. A shaft coupling comprising a pair of complementary members having substantially spherical heads provided in their forward faces with substantially square sockets, a floating link connecting said members and having substantially square heads received in said sockets, said heads being angularly offset about the axis of the link with the edges of one head in alignment with the sides of the other head, a pair of housing members having rear ends shaped to fit said spherical heads and engaging the same, and means for connecting the forward ends of said housing members.

3. A shaft coupling comprising a pair of complementary coupling members having heads, power transmitting means connecting said members, a pair of housing members engaging said heads respectively, and an internal coupling ring in threaded engagement with the ends of said housing members for connecting the latter.

4. A shaft coupling comprising a pair of complementary coupling members having substantially spherical heads, power transmitting means connecting said members and adapted to permit relative endwise movement thereof, a pair of substantially cylindrical housing members of a diameter substantially equal to that of said heads and having rear ends shaped to fit the latter, and an internal coupling ring in threaded engagement with the forward ends of said housing members for connecting the same, said coupling ring being engaged by said coupling members to limit the endwise movement of the latter.

5. A shaft coupling comprising a pair of complementary coupling members having substantially spherical heads provided in their forward faces with non-circular sockets, a floating link connecting said members and having heads received in said sockets, the heads on said link substantially corresponding in transverse section to said sockets, and said sockets being of a sufficient depth to permit relative endwise movement of said members while maintaining the engagement of said link with said sockets, a pair of substantially cylindrical housing members of a diameter substantially equal to that of the heads of said coupling members and having rear ends shaped to fit the latter, and an internal coupling ring in threaded engagement with the forward ends of said housing members for connecting the same, said coupling ring being engaged by said coupling members to limit the endwise movement thereof.

6. A shaft coupling comprising a pair of complementary coupling members adapted to be secured to adjacent shaft sections and provided in their opposed faces with substantially square sockets, and a floating link connecting said members and having substantially square heads received in said sockets, the heads being angularly offset about the axis of the link with the corners of one head in alignment with the sides of the other head.

7. A shaft coupling comprising a pair of complementary coupling members adapted to be secured to adjacent shaft sections and provided in their opposed faces with substantially square sockets, and a floating link connecting said members and having substantially square heads received in said sockets, the heads being angularly offset about the axis of the link with the corners of one head in alignment with the sides of the other head and the sides of the heads being rounded longitudinally.

8. A shaft coupling comprising a pair of complementary coupling members adapted to be secured to adjacent shaft sections and provided in their opposed faces with polygonal sockets, and a floating link connecting said members and having polygonal heads received in and having the same number of sides as said sockets, the heads being angularly offset about the axis of the link with the edges or corners of one head in alignment with the sides of the other head.

9. A shaft coupling comprising a pair of complementary coupling members adapted to be secured to adjacent shaft sections and provided in their opposed faces with polygonal sockets, and a floating link connecting said members and having polygonal heads received in and having the same number of sides as said sockets, the heads being angularly offset about the axis of the link with the edges or corners of one head in alignment with the sides of the other head, the sides of the heads being rounded longitudinally.

10. A shaft coupling comprising a pair of complementary coupling members adapted to be secured to adjacent shaft sections, a floating link connecting said members, said members and link having substantially square interlocking heads and sockets so arranged that when assembled the heads are offset angularly about the axis of the link with the edges of one head in alignment with the sides of the other head.

11. A shaft coupling comprising a pair of complementary coupling members adapted to be secured to adjacent shaft sections, a floating link connecting said members, said members and link having substantially square interlocking heads and sockets so arranged that when assembled the heads are offset angularly about the axis of the link with the edges of one head in alignment with the sides of the other head, the sides of the heads being rounded longitudinally.

12. A shaft coupling comprising a pair of complementary coupling members, a floating link connecting said members, said members and link having polygonal interlocking heads and sockets so arranged that when assembled the heads are offset angularly about the axis of the link with the edges of one head in alignment with the sides of the other head.

In testimony whereof we affix our signatures.

LAWRENCE F. WHITNEY.
GEORGE A. KAY.